United States Patent [19]

Johnson

[11] 3,833,773

[45] Sept. 3, 1974

[54] TELEPHONE SYSTEM TROUBLE RECORDER

[75] Inventor: John G. Johnson, Elmhurst, Ill.

[73] Assignee: GTE Automatic Electric Laboratories Incorporated, Northlake, Ill.

[22] Filed: Aug. 28, 1972

[21] Appl. No.: 284,030

[52] U.S. Cl. .......... 179/175.2 R

[51] Int. Cl. .......... H04m 3/24

[58] Field of Search .......... 179/175.2 C, 175.2 R; 346/34, 44, 45; 340/172.5

[56] References Cited

UNITED STATES PATENTS

| | | | |
|---|---|---|---|
| 3,118,722 | 1/1964 | Pullis et al. | 346/34 |
| 3,299,220 | 1/1967 | Wedmore | 179/175.2 R |
| 3,329,965 | 7/1967 | Avery | 179/175 |
| 3,393,300 | 7/1968 | Jennings et al. | 346/44 |
| 3,626,384 | 12/1971 | Davis et al. | 340/172.5 |
| 3,699,532 | 10/1972 | Schaffer et al. | 340/172.5 |
| 3,727,192 | 4/1973 | Cheney et al. | 340/172.5 |

*Primary Examiner*—Kathleen H. Claffy
*Assistant Examiner*—Douglas W. Olms
*Attorney, Agent, or Firm*—Robert J. Black

[57] ABSTRACT

A trouble recorder for use in a telephone system. Internal storage is provided for trouble messages received from the telephone system. A plurality of input data highways are provided with facilities for connecting the highway to alternate storage devices if the normally connected storage devices are in use.

6 Claims, 9 Drawing Figures

TELEPHONE SYSTEM TROUBLE RECORDER

BACKGROUND OF THE INVENTION

1. Field of the Invention

This invention relates to telephone systems and more particularly to a system for recording trouble encountered in the processing of calls.

2. Description of the Prior Art

To meet the principal requirement of satisfied customers continued monitoring of telephone switching equipment is of the highest priority. It is only by such continued monitoring that rapid maintenance of faulty conditions may be provided. Such monitoring of necessity should provide reliable and economical means for creating a record of the trouble discovered in order to permit maintenance personnel to successfully perform their function. Such record must not only indicate that a fault exists but what equipment is involved and the location of such equipment. In common control telephone systems, the basic concern from maintenance standpoint is the catastrophic nature of even minor circuit malfunctions. Inasmuch as most components of electronically controlled telephone systems are mounted on printed circuit cards maintenance is facilitated by rapid discovery of the fault and replacement of the circuitry involved.

The earliest forms of telephone system trouble or fault monitoring involved the use of indicators and common alarm circuits associated with the various subsystems and elements of the switching system. In such an arrangement an individual indicator (usually visual), was located on each piece of equipment, with a trouble lead extending to a common alarm circuit. In such an arrangement the occurrence of trouble would cause the indicator to operate at the particular equipment as well as the operation of a common alarm (usually audible). In such an arrangement maintenance personnel detecting the general alarm would then immediately search the frames of the system or subsystem associated with the general alarm, looking for the specific circuit marked by the individual alarm indicator. Such an arrangement was then recorded and the necessary maintenance undertaken.

More sophisticated systems involve the location of appropriate indicators for each piece of equipment on a common trouble console included as part of a testing and maintenance center, with procedures being similar to that outlined above, with the exception of the location of the particular equipment involved which was readily located. A trouble ticket was then manually prepared and maintenance unertaken.

More recently it has become common to employ the use of a teletypewriter to print records of trouble encountered, with such records indicating the fault involved as well as the location of the faulty equipment.

Such a system is disclosed in U.S. Pat. No. 3,299,220 issued to William R. Wedmore on Jan. 17, 1967. In such a system the use of page printers or teletypewriters provides an acceptable means for recording system faults.

However, when such systems are used with electronically controlled telephone switching systems, the operating time of electronically controlled circuitry is conventionally at an extremely high rate. Accordingly the mechanical operation of the teletype is sometimes incapable of producing trouble reports as rapidly as faults occur within the switching system. The result being that trouble reports are frequently lost within the trouble recording system itself.

SUMMARY OF THE INVENTION

An object of the present invention is to provide a trouble recording system for use with a telephone switching system that provides for the internal storage of received trouble messages with the ability to provide a printed record of such trouble within a short period of time after it occurs.

Another object of the present invention is the inclusion within the system of equipment permitting several incoming sources to permit recording of the trouble information in alternate locations, increasing the flexibility and providing greater utilization of the trouble recording system.

Briefly these and other objects of the present invention are realized in a specific embodiment thereof that utilize the following described techniques of the present invention to meet the above objects.

The trouble recorder of the present invention is a subsystem for storing decoding and printing out data received from the call processing subsystems when those subsystems encounter trouble in the processing of calls. The output of the present trouble recorder is a printed sheet or ticket, showing identity of the reporting equipment location and other pertinent data. The data once printed out will be identified by its location on a pre-printed form or by the utilization of a transparent overlay. In this latter case plain paper may be used. In order to avoid multiple designations on spaces, each subsystem has its own line on the print out form. This printed information is typically in decimal numbers or in mnemonic letters. Generally speaking the coding of data is not employed in the present system except in a few instances where it may be required to maintain a practicable output format.

In the present system the output device is a hundred word per minute teletypewriter equipped with a multiple wire distributor. Within the present system it is also possible for an optional tape punch to be provided either in place of or in parallel with the teletypewriter. This provision may be employed wherein a machine readable output is desired. Because the trouble recorder subsystem is not directly involved in call processing usually only one trouble recorder per telephone office is furnished.

Access to the trouble recorder is obtained by requesting such access of a trouble recorder assigner which is separate from the trouble recorder and does not form a portion of the present invention. Certain subsystems involved in call processing are allowed direct access to the trouble recorder. Such subsystems include register senders, register sender access controls, markers, translator assigners and the trouble recorder assigner itself.

A translator may also access the trouble recorder by requesting such access of its associated assigner, which has an access to the trouble recorder. In this case the translator and its assigner can simultaneously dump their data into the trouble recorder storage. The translator can in addition tell an attached register sender to dump its data into the trouble recorder. In this case the data of all three subsystems will be printed on the same trouble report.

In the present trouble recorder storage of information is provided in order not to tie up the call processing subsystems equipment, while the trouble report is being printed out. This is essential, for example where the office may be operating on a single translator. Storage for received trouble report is furnished so a second report may be stored while the first is being printed out. The data received is stored on relays in the present system. These relays are normally connected to a data highway from the call processing subsystem equipment through low voltage drivers which interface with the electronic subsystem operational levels of the switching system.

Simultaneously with the forwarding of the identity of a demanding circuit, the trouble recorder assigner will notify the demanding circuit to place its data on the highway. After the data has been successfully stored, and provided there is no data stored in a second buffer storage, the trouble recorder will transfer the highway in which the data has just been received over to a second buffer storage.

As part of the data recorded each trouble report must be identified as actual trouble, time outs (which may or may not be trouble) or test call results. On the print out a special marking will be provided for each type of data. This particular form will aid the maintenance man in making quick decisions as to which trouble tickets are important and later permit collating of trouble reports to screen out test calls or time outs as desired.

In the present trouble recorder system once an identity has been received and stored from the trouble recorder assigner, the sequence of events is under control of a line and space counter associated with the teletypewriter. The line and space counter provides a discrete mark for each line and space in the trouble report form. This mark connects the output of the digital storage to a decoder. The decoder then takes the stored bits and converts them into a single (usually numeric) mark. Thus the stored bit is translated into a character or message. This information is presented to an encoder that takes the single mark from the decoder and converts it into the seven bit ASCII (American Standard Code for Information Interchange) code required by the teletype.

The seven or less bits which comprise the ASCII code are presented in parallel to a multiple wire distributor which in turn converts them to serial form for transmission to the teletype's basic receiving and typing unit. The multiple wire distributor also has an auxiliary set of contacts that are used to drive the line and space counters. A clock and calendar circuit provides date and time which are entered on each trouble ticket. Associated with the trouble recorder but not forming an actual portion of the invention is a monitor panel. The monitor panel circuitry is in parallel with the various portions of the trouble recorder. By means of the parallel connections a manual readout by means of lamps is provided in case the teletype is out of service for maintenance and repairs.

DESCRIPTION OF THE PREFERRED EMBODIMENT

Figure 1:
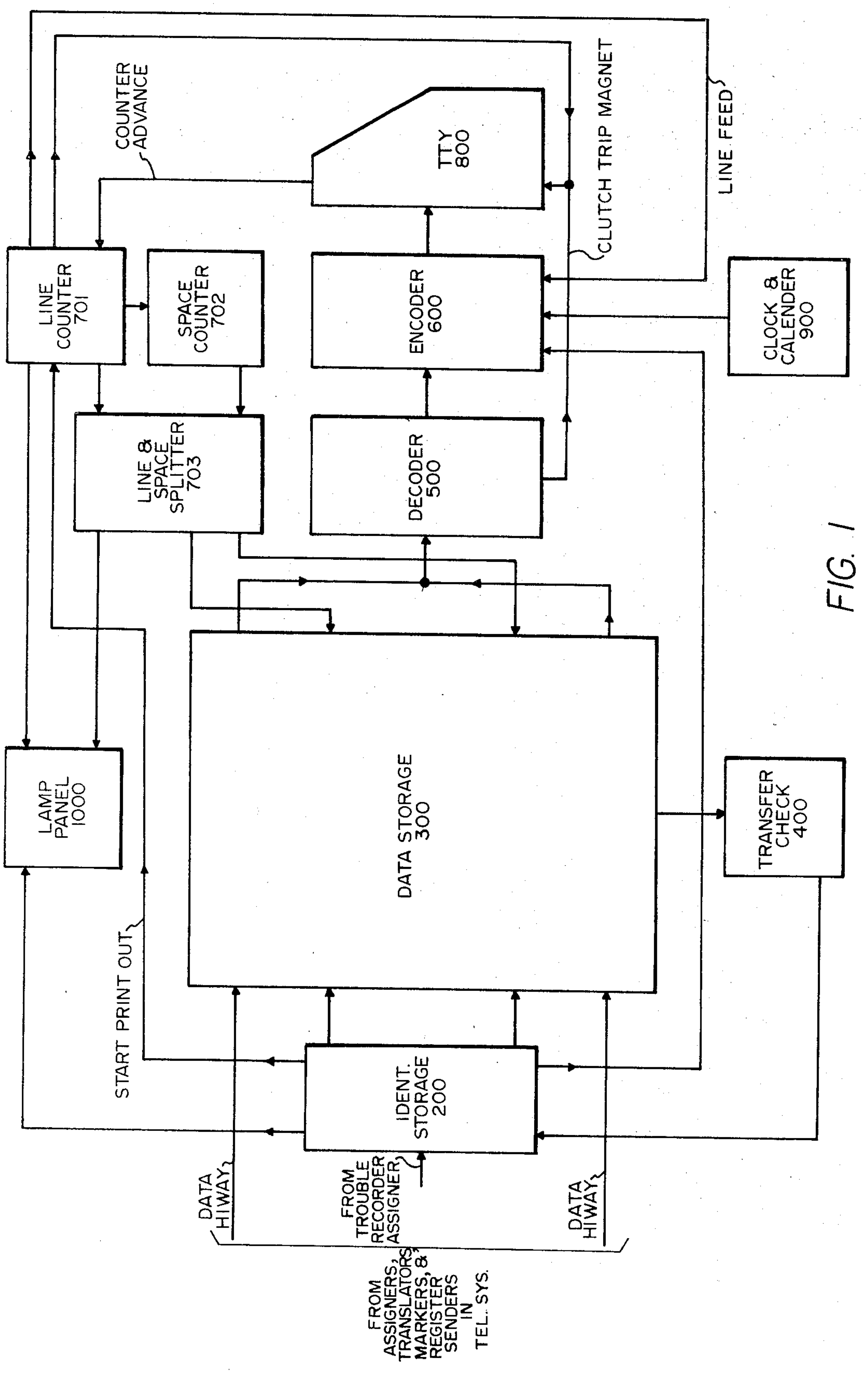
FIG. 1 is a block diagram of a trouble recorder for use with a telephone system in accordance with the present invention.

Referring now to FIG. 1 there is shown the organization of a trouble recorder in accordance with the present invention. Each of the circuits comprised in the telephone recorder will be discussed in detail in the following. However it should be noted that the detailed circuitry of many of the sections of the present invention is not shown inasmuch as a variety of configurations may be employed to achieve operation like that required in the present invention. Rather each circuit will be described in terms of its function and the particular implementation employed in at least one constructed embodiment of the present invention.

As may be noted by reference to FIG. 1, various subsystems including assigners, translators, markers and registers are connected by way of data highways to the trouble recorder and particularly to the data storage 300. Additional input connections to the data recorder come from an associated trouble recorder assigner and connect to the identity storage 200.

Permission to access the trouble recorder is obtained via the trouble recorder assigner. As noted this is a separate subsystem and not part of the trouble recorder. However for our proper understanding of the present invention some familiarity with the principle of trouble recorder assigner functions is required.

Only certain of the telephone systems subsystems are allowed to command access to the trouble recorder. These include register senders and registor sender access controls, translator assigners and markers. In addition a translator may access the trouble recorder by requesting connection from the translator assigner. In the electronically controlled switching system with which the trouble recorder is intended for use, the circuitry of the individual subsystems outlined above are principally electronic and therefore relay drivers may be employed in conjunction with the subsystems to provide proper signal levels for access of the trouble recorder.

As shown in FIG. 1, two data highways provide access to the data storage 300. However, a greater number of data highways may be incorporated to facilitate connection to the various subsystems. A minimum of two highways are incorporated in the present system to simplify maintenance and prevent the occurrence of a single fault on the highway from disabling all reports from the associate subsystems. After a first report is stored the two highways are tied together and connected to idle storage. This facet will be discussed in detail below.

Figure 2:
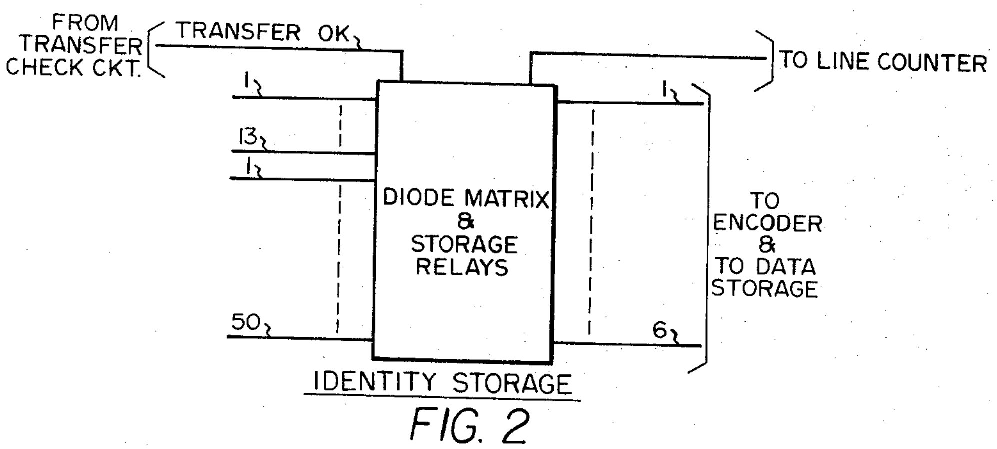
FIG. 2 is a block diagram showing the detailed input/output connections of the identity storage circuitry utilized in the present invention.

Referring now to FIG. 2, the identity storage 200 is a diode matrix arranged to accept the identity of the reporting equipment. This identity consists of two marks i.e., a "group" mark and a "units" mark. In the present diode matrix that comprises the identity storage of FIG.

2 up to 13 group marks may be accepted as well as up to 50 unit marks. For example a register sender may be identified as group 1 unit 11 while a marker may be group 6 unit 10. The units number received from the trouble recorder assigner is broken up by the diode matrix into a number in the tens group and units group. Internal checking circuitry is provided to verify that one and only one group mark has been received, that one and only one tens, and that one and only one units number have been stored in the relays that comprise a portion of data storage 300. Naturally proper identification of the subsystem reporting trouble is of paramount importance, so that the trouble recorder may properly print out data as received and then prepare for receipt of a further trouble report.

Figure 3:
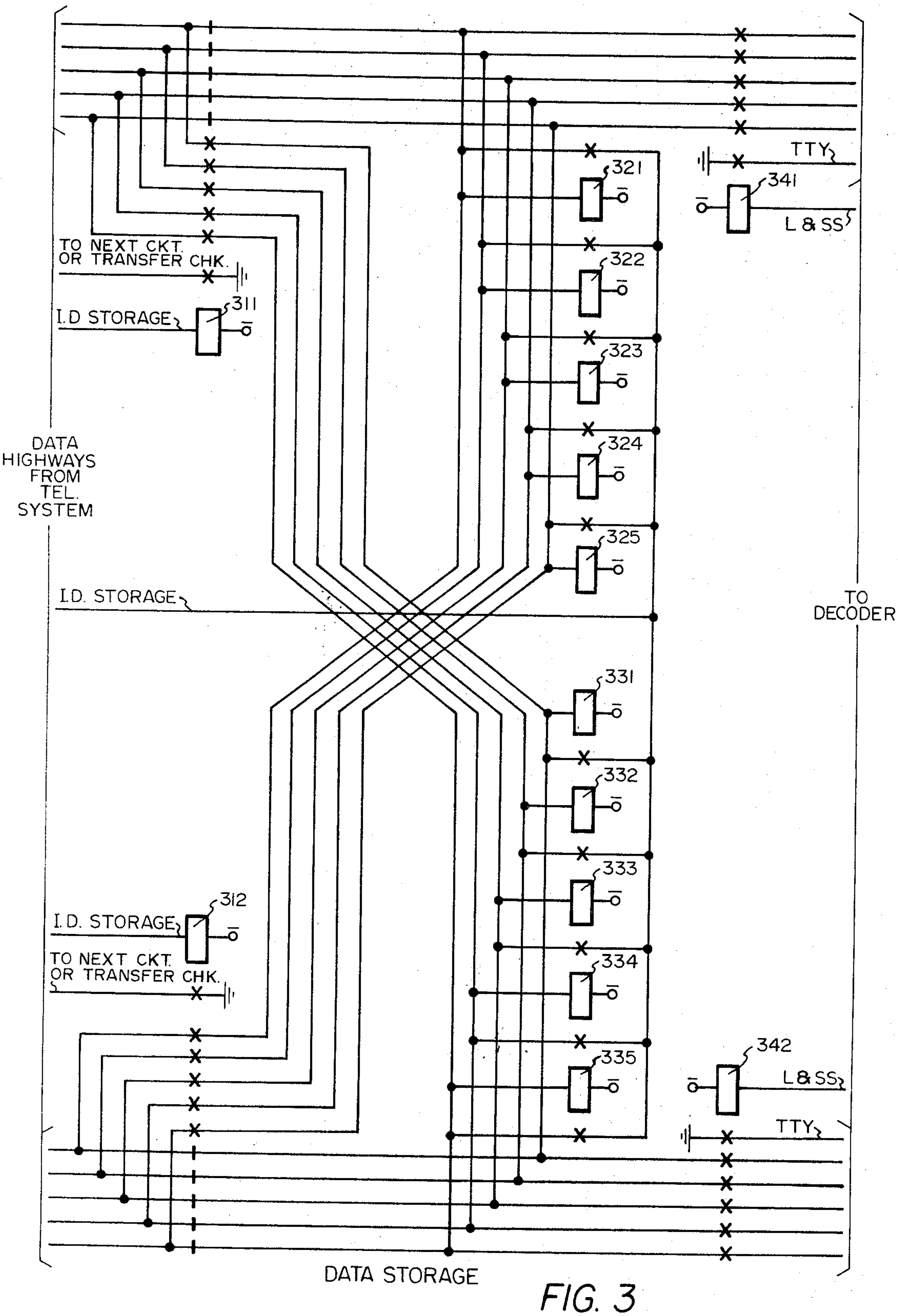
FIG. 3 is a schematic circuit diagram of a portion of the data storage circuitry included in the present invention.

Data storage 300 as noted by reference to FIG. 3 consists of relay groups associated with identity storage and readout. Relays such as 311 and 312 are connected to the identity storage 200 for transfer purposes if required. Incoming data is stored on relays such as 321 through 325 and 331 through 335 inclusive on a two out of five coded basis. Simultaneously with the forwarding of the identity of the demanding circuit the trouble recorder assigner notifies the demanding circuit to place its data on the highway. The first storage relays such as 321 through 325 operate in response to the five bits of a first report. If a second report is received over the same highway the transfer relay 311 under control of identity storage 200 will operate and conduct the incoming data to storage relays 331 through 335 inclusive. Likewise information for the identity storage as to the particular identity of the reporting point is forwarded simultaneously to the encoder where it will be placed in ASCII code and conducted to the teletype 800 for use in preparing the trouble report.

As part of the received data each trouble report must be identified as "trouble" (which may include timeouts definitely analyzed as trouble), timeouts (which may or may not be trouble), or "test call results" resulting from test panel initiated calls. These different types of trouble reports are identified as such on the printouts by virtue of appropriate coding. If data has been successfully stored on data storage relays 321 through 325 inclusive and provided no data is stored in the second buffer store (relays 331 through 335 inclusive) the trouble recorder will proceed to transfer the highway on which data has just been recieved over to the second buffer store.

Figure 4:
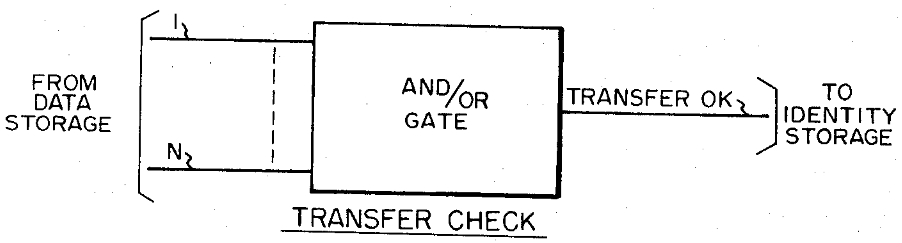
FIGS. 4, 5, 6, 7A and 7B are block diagrams showing detailed input/output circuit connections of the transfer check circuit, decoder circuit, encoder circuit, line counter circuit and space counter circuit respectively as included in the present invention.

Since large numbers of relays are involved in the highway transfer circuits, a transfer checking circuit is provided as shown in transfer check circuit FIG. 4. Each of the transfer relays such as 311, includes, in addition to the transfer contacts, a contact which in most cases is connected to operate a succeeding similar relay in a cascade arrangement. Then the output of the last relay of each of several cascaded groups is connected to the transfer check circuit of FIG. 2. The transfer check circuit is a relay gate arrangement that functions as an AND gate to indicate transfer of all groups and acts as an OR gate on release of the transfer circuitry. The output of this gate is supplied to the identity storage to indicate that the storage circuitry is idle and may accept more data. That is to say after a second trouble report is printed, the highway transfer relays will release the transfer checking circuit of FIG. 4 verifying that all transfer relays have released. At this time reporting equipment may be advised that trouble report signals can be accepted.

After the first report has finished its printout and released its buffer storage (relays 321 through 325 etc.) connection of the highways to the reporting equipment is transferred again. It should be noted that whenever either buffer storage is loaded one of the data highways must be transferred. As long as a buffer storage is not loaded the highways will be connected to the idle storage.

From a combination of whether a trouble report is a first report or a second report and whether the highways were transferred or not, it can be determined which set of buffer storage relays contain the information. The appropriate read relay (341 or 342 of FIG. 3) is then operated connecting the data highways to which the storage relays are connected to the decoder 500. In actual practice these relays are interlocked so that only one may be operated at a given time. With operation of the appropriate read relay the printout function will begin and the teletype prepared for operation.

The teletypewriter utilized in a constructed embodiment of the present invention is a Type 35,100 word per minute machine as manufactured by Teletype Corporation and equipped with a multiple wire distributor. The character used is that 8 bit per character code called the ASCII (American Standard Code for Information Interchange). In addition to the 8 bits there is a start and stop signal required at the start and end of each character. Even though the teletypewriter motor runs continuously, internal operation of the machine is such that the machine is literally stopped and started for each character. The basic teletypewriter machine i.e., without a multiple wire distributor is arranged to receive a start signal then 8 bits one by one, followed by a stop signal over a two wire circuit. In order that each signal or bit will fall into the proper time slot, accurate timing is required. With the addition of the multiple wire distributor, the teletypewriter is changed to a parallel input machine and the timing requirements are taken care of by the distributor. With the distributor there are 8 leads one for each bit plus a clutch trip magnet lead, and a pair of wires from its distributor for every contact. To print a character it is only necessary to close the circuit to the bit leads corresponding to the character to be printed and momentarily operate the clutch trip magnet. There are no leads for the start and stop signals since these signals are generated internally by the multi-wire distributor. The output of the multi-wire distributors sends the signals as serial bits for use in the basic teletypewriter receiving mechanism.

There is no timing problem since both units are driven by synchronous motors operated off the ac power line. The distributor auxiliary contacts mentioned, close a circuit a few milliseconds after a clutch trip magnet has been energized and open shortly after all bits of the character code has been sent from the distributor to the basic teletypewriter. This closing and opening of these contacts is used to drive the line counter 701 and space counter 702 of the trouble recorder.

The sequence of operation of the teletypewriter 800 is under control of the line counter 701, space counter 702, and the line and space splitter 703. The lines and spaces referred to are those utilized on the trouble report (print out) form.

Figure 7A:
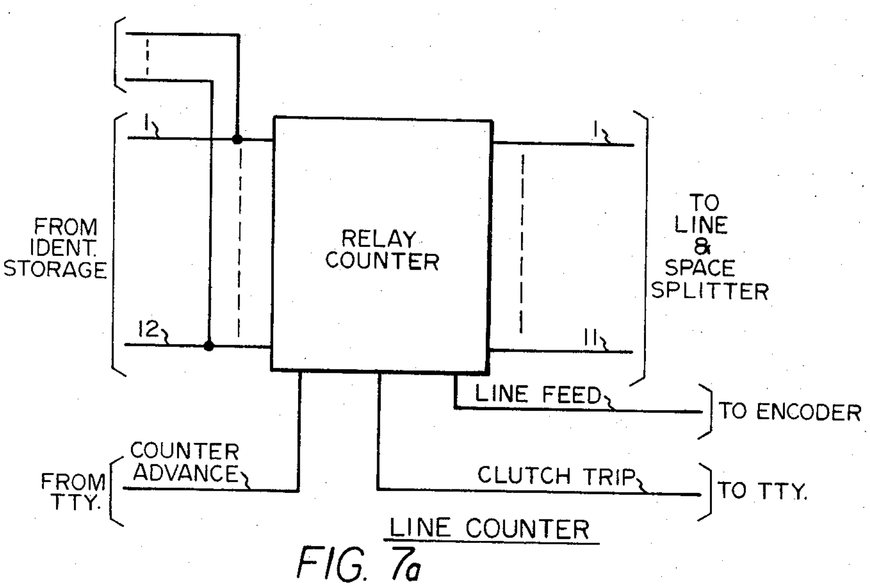

Though the line counter 701 chief function is to count the lines on the trouble report form, it is also arranged to send carriage return signals at the start and end of each trouble report and also a form out signal to the teletype at the end of the trouble report. There is also a line end relay for each line. These relays operate at the end of a printing out of a line or upon reaching a line where there is nothing in storage for that line as determined by the identity storage. In essence the line counter is a simple relay counter with controls, inputs and outputs as shown in FIG. 7A.

Figure 6:
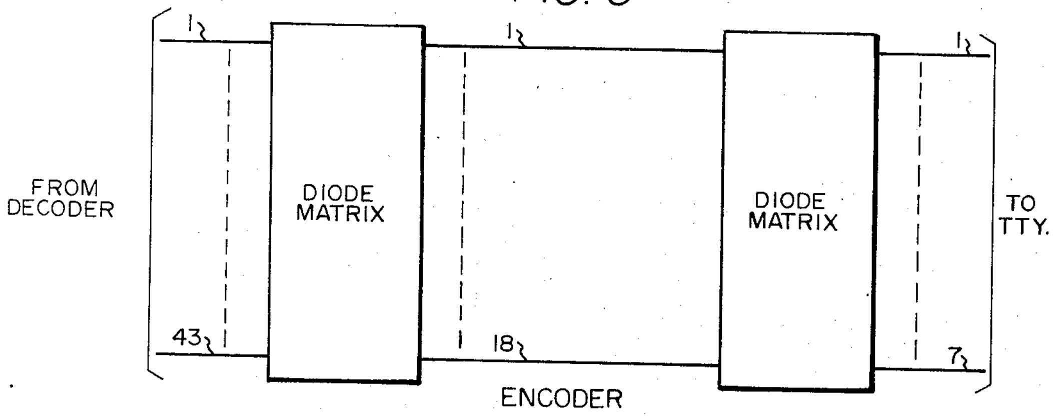

To cause the teletype to print a character or perform a non-printing function the procedure is always the same—ground is forwarded to the desired character lead terminal of the encoder 600 which consists of two diode matrices as shown in FIG. 6. By this means the proper bits are derived, the distributor clutch trip magnet is operated, ground is returned by the distributor auxiliary contacts to step the line counter 701 and/or the space counter 702, the clutch trip magnet is released, the teletypewriter 800 prints the character or performs the non-printing function, the distributor auxiliary contacts open and the teletypewriter is ready for the next character.

At the start of each printout a carriage return, and line feed signals are sent to teletype 800. Succeeding line feeds are sent until a line is reached that is to be printed out. Here the line feeds are discontinued, the space start signal is sent to the space counter 702. A "read" ground is connected to contacts of the first ten relays of the line and space splitter 703 shown in FIG. 7C. This circuit functions as a group of coded AND gates. The teletypewriter distributor auxiliary contacts are then switched over to the space counter 702.

Figure 7B:
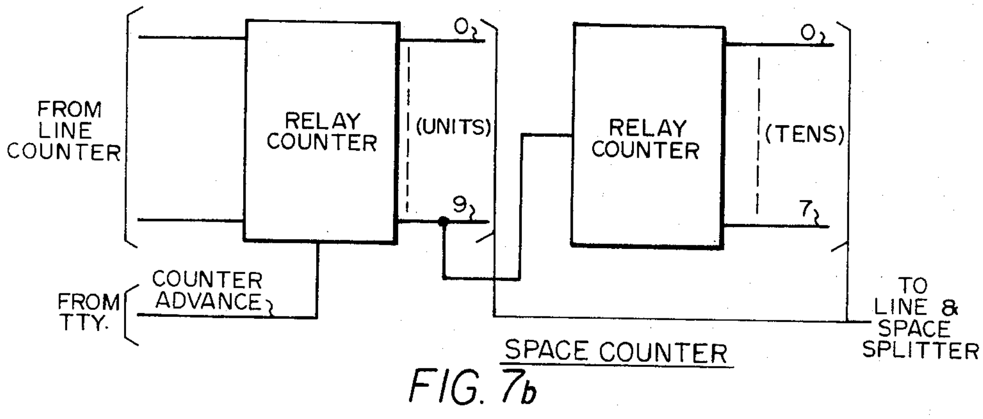
Figure 7C:
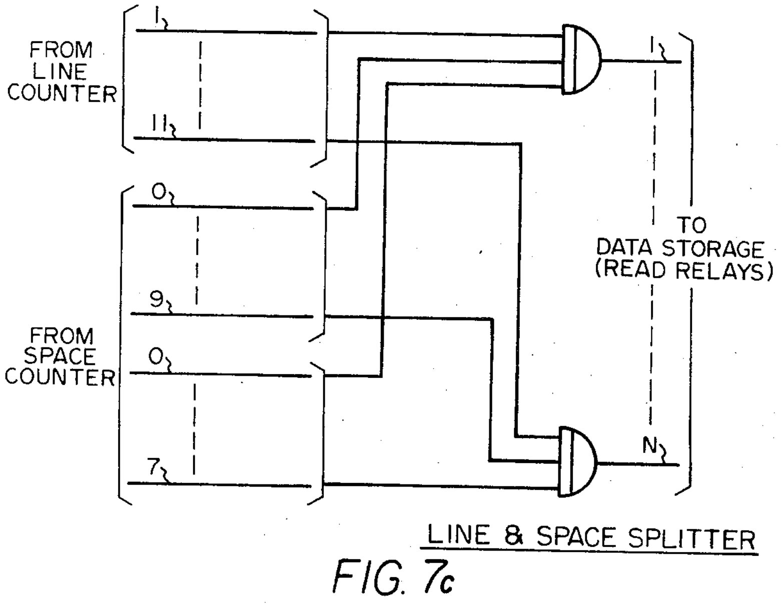
FIG. 7C is a logic diagram of the line and space splitter circuitry employed in the present invention.

The space counter 702 shown in FIG. 7B actually consists of two relay counters. A 10 step "units" counter (output 0 through 9 inclusive) and an 8 step "tens" counter (output 0 through 7 inclusive). This permits a total of 80 steps or 80 spaces to a line. The tens counter connects resistance battery to the line and space splitter of FIG. 7C in groups of 10. The units counter connects ground to one relay in each of these groups on each step, this way only one relay of the line and space splitter operates for each step. The relays that are included in the line and space splitter each have 6 sets of springs. One set on each relay is utilized for an individual line so that each relay serves a particular space for 6 lines. The line counter 701 connects ground to only one set of springs at a time. Thus through the combined efforts of the line counter 701 and the space counter 702 and the line and space splitter 703 a discrete mark is developed for each space of each line on the trouble report form.

Figure 5:
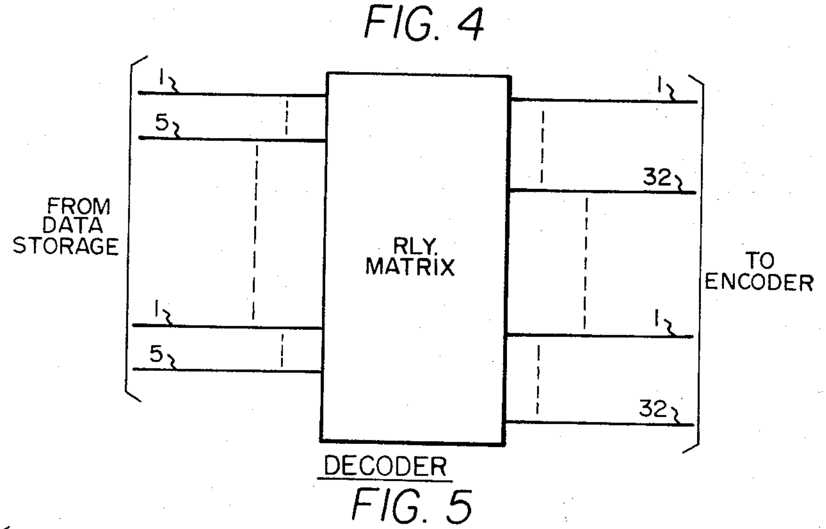

Referring now to FIG. 5 the decoder 500 is shown. This decoder is a relay matrix divided into two similar halves, the first half used to read data from even number storage, the second half to read data in the odd number storage. For example the first half might read data received and stored from relays such as 321 through 325 of a first FIG. 3 and the second half of the decoder would read from similar storage in a second FIG. 3. By this technique of using each half of the decoder alternately, the decoder—and thus the trouble recorder system—can operate at the maximum speed of the output teletypewriter. The basic performance of each section of the decoder is to provide a one out of 32 available marking from a two out of five coded input. The decoder decodes the standard two out of five storage code utilized in the present system and utilizing the bits 0, 1, 2, 4 and 7. When these codes are correctly stored the output of the decoder is in ordinary decimal system digits. Other special codes may be developed to provide alphabetic printouts such as 0 only for A, 1 only for B, 2 only for C etc. The single markings developed by the decoder 500 are conducted to the inputs of encoder 600 shown in FIG. 6.

Encoder 600 as well as receiving outputs from the decoder 500 as input signals receives similar markings from the identity storage 200 as noted previously and from a clock and calendar circuit 900. The encoder 600 is a two stage diode matrix arranged to translate the single marks received on input leads 1 through 43 into the 7 bit ASCII code.

The clock and calendar circuit 900 consists of a straightforward group of mechanical counters stepped by a one pulse per minute synchronous motor driven timer. Individual counters are provided for minutes-units, minutes-tens, hours-units, hours-tens, days-units and days-tens. As a practical matter the days-tens and unit counter is actually a 40 step counter and for that reason is manually set at the end of each month. Outputs from the clock and calendar circuitry are translated by the encoder 600 and then printed out by teletype 800 on the trouble report form..

As noted previously a lamp panel 1000 is also provided wherein data as to information stored within the trouble recorder during its operational cycle is available for monitoring purposes. It is not expected that this information will be normally observed. However in case of difficulty with the teletypewriter trouble information may be derived from this source.

What is claimed is:

1. For use with a telephone switching system, a trouble recorder comprising: identity storage means connected to said telephone switching system; printout means; and data storage means including a first and second plurality of storage devices, said first plurality of storage devices normally connected to said telephone system through at least a first data transmission highway, said second plurality of storage devices connected to said telephone system through at least a second transmission highway, said data storage means further including separate readout means associated with each of said storage devices; a counting means comprising a line counter, a space counter and a line and space splitter, connected between said printout means and said data storage readout means, said line counter operated in response to said printout means to periodically advance said line counter and said space counter periodically advanced in response to said line counter; and said line and space splitter connected to said line counter and to said space counter, periodically operated in response thereto to operate said readout means included in said data storage; whereby information stored in said data storage devices is transmitted to said printout means thereby to create a printed record of data received from said telephone system over said data transmission highways.

2. A trouble recorder as claimed in claim 1 wherein there is further included first transfer means associated with said first data highway, operated in response to said identity storage means subsequent to the storage of data in said first plurality of storage devices associated with said first data highway, to connect said first highway to said second plurality of storage devices; and second transfer means associated with said second highway operated in response to said identity storage means after data received from said telephone system via said second data highway is stored in said second plurality of storage devices associated with said second data highway, to connect said second highway to said first plurality of storage devices.

3. A trouble recorder as claimed in claim 1 wherein there is further included: decoding means including input connections connected to said data storage means and encoding means connected between the output of said decoding means and the input of said printout means; said decoding means operated to decode information stored in said data storage means and said encoding means operated to re-encode said coded information from said decoder and transmit said re-encoded information to said printout means.

4. A trouble recorder as claimed in claim 2 wherein there is further included: transfer check means connected to a portion of said plurality of transfer means included in said data storage means, operated in response to operation of a predetermined plurality of said transfer means to provide indication of said transfer to said identity storage means.

5. A trouble recorder as claimed in claim 3 wherein there is further included: marking means periodically operated to provide a chronological marking to said encoding means, and said encoding means operated to transmit coded chronological markings to said printout means.

6. A trouble recorder as claimed in claim 3 wherein there is further included: visual indicating means connected to said encoding means and to said identity storage, operated to provide visual indications of data information received by said identity storage means and as encoded by said encoding means.

* * * * *